US009392857B2

(12) United States Patent
Jung

(10) Patent No.: US 9,392,857 B2
(45) Date of Patent: Jul. 19, 2016

(54) CONTAINER PROVIDED WITH A VACUUM PUMP FOR CREAM-TYPE COSMETICS

(71) Applicant: YONWOO CO., LTD., Incheon (KR)

(72) Inventor: Shin-Bok Jung, Incheon (KR)

(73) Assignee: YONWOO CO., LTD., Incheon (KR)

( * ) Notice: Subject to any disclaimer, the term of this patent is extended or adjusted under 35 U.S.C. 154(b) by 0 days.

(21) Appl. No.: 14/385,922

(22) PCT Filed: Feb. 14, 2013

(86) PCT No.: PCT/KR2013/001133

§ 371 (c)(1),
(2) Date: Oct. 23, 2014

(87) PCT Pub. No.: WO2013/141485

PCT Pub. Date: Sep. 26, 2013

(65) Prior Publication Data

US 2015/0090739 A1 Apr. 2, 2015

(30) Foreign Application Priority Data

Mar. 22, 2012 (KR) ........................ 10-2012-0029097

(51) Int. Cl.

| | |
|---|---|
| ***B67D 7/06*** | (2010.01) |
| ***B65D 88/54*** | (2006.01) |
| ***G01F 11/00*** | (2006.01) |
| ***A45D 40/00*** | (2006.01) |
| ***B05B 11/00*** | (2006.01) |

(52) U.S. Cl.
CPC .......... *A45D 40/0075* (2013.01); *B05B 11/007* (2013.01); *B05B 11/0016* (2013.01); *B05B 11/0024* (2013.01); *B05B 11/0048* (2013.01); *B05B 11/0072* (2013.01);

(Continued)

(58) Field of Classification Search
CPC .................... A45D 40/0075; A45D 2200/051; A45D 2200/056; B05B 11/0016; B05B 11/0024; B05B 11/0048; B05B 11/007; B05B 11/0072; B05B 11/3023; B05B 11/3025; B05B 11/3047; B05B 11/3074; B05B 11/0037; B05B 11/3059; B05B 11/3069
See application file for complete search history.

(56) References Cited

U.S. PATENT DOCUMENTS 5,052,592 A * 10/1991 Wilken ............. B65D 83/0033 222/212
6,971,557 B2 12/2005 Mather et al.

(Continued)

FOREIGN PATENT DOCUMENTS

| | | | |
|---|---|---|---|
| KR | 2009-0008477 | U | 8/2009 |
| KR | 2011-0034707 | A | 4/2011 |
| KR | 2011-0039000 | A | 4/2011 |

OTHER PUBLICATIONS

International Search Report issued in Application No. PCT/KR2013/001133 dated Mar. 20, 2013.

*Primary Examiner* — Frederick C Nicolas
(74) *Attorney, Agent, or Firm* — Marshall, Gerstein & Borun LLP

(57) ABSTRACT

The present invention relates to a container provided with a vacuum pump for creamy-type cosmetics. According to the container provided with a vacuum pump for a creamy-type cosmetics of the present invention, the discharge hole of a button part is positioned so as to be biased, and a pressure display part is formed in the upper middle portion of the button part, in order to pressurize the button part and thus enable the user to accurately ascertain the pressure portion of the button part, and the contents can be uniformly discharged by simply pumping using one hand without causing the button part to incline.

7 Claims, 7 Drawing Sheets

(52) U.S. Cl.
CPC ........ *B05B 11/3023* (2013.01); *B05B 11/3025* (2013.01); *B05B 11/3047* (2013.01); *B05B 11/3074* (2013.01); *A45D 2200/051* (2013.01); *A45D 2200/056* (2013.01); *B05B 11/0037* (2013.01); *B05B 11/3059* (2013.01); *B05B 11/3069* (2013.01)

(56) References Cited

U.S. PATENT DOCUMENTS 7,578,417 B2 * 8/2009 Son .................... B05B 11/0064 222/257
8,118,193 B2 * 2/2012 Law ...................... A45D 34/04 222/205
8,608,029 B2 * 12/2013 Lee ...................... A45D 34/00 222/135
2008/0169312 A1 * 7/2008 Kee .................... B05B 11/0048 222/205
2009/0071985 A1 * 3/2009 Ki ...................... B05B 11/0027 222/309
2009/0179048 A1 7/2009 Decottignies et al.
2014/0103068 A1 * 4/2014 Son ......................... B65D 3/04 222/105

* cited by examiner

CONTAINER PROVIDED WITH A VACUUM PUMP FOR CREAM-TYPE COSMETICS

RELATED APPLICATIONS

This application claims the benefit of priority under 35 U.S.C. §119 of Korean patent application KR 10-2012-0029097, filed Mar. 22, 2012, the entire specification of which is incorporated by reference herein, in its entirety and for all purposes.

TECHNICAL FIELD

The present invention relates to a container provided with a vacuum pump for creamy-type cosmetics. According to the container provided with a vacuum pump for a creamy-type cosmetics of the present invention, the discharge hole of a button part is positioned so as to be biased, and a pressure display part is formed in the upper middle portion of the button part, in order to pressurize the button part and thus enable the user to accurately ascertain the pressure portion of the button part, and the contents can be uniformly discharged by simply pumping using one hand without causing the button part to be inclined.

BACKGROUND ART

Generally, a conventional cosmetic container with a vacuum pump, having the structure that holds contents and prevents air contact, comprises: a container body which stores contents; a support body which is encirclingly combined into the upper part of the said container body and supports the pumping member; a pumping member which is combined into the support body, makes the inner space of the container body vacuumed, and discharge the contents by pumping movement; a button part which is located on the upper part of the said pumping member, pressurizes the pumping member as the user presses, and forms a contents discharging hole in the middle; a piston which is engaged into the inner space of the container body and rises/descends with the movement of the pumping member.

The cosmetics container with a vacuum pump made up of the above composition comprises a concave depression which gets deeper towards the center on the top of the button part, so that a user can have contents discharged into the depression and apply the contents by coating the contents with their fingertip. Due to the structure wherein the discharging hole is placed in the middle, it is not possible that a user can pump the contents by pressing the center part; instead, the pumping can only be performed through pressing either one side or both sides of the top of the button part.

However, when one side of the button part is pressed by one hand, the button part will be likely to be tilted to one side; as a result, the pumping cannot be performed properly and a problem may occur, wherein the contents cannot be discharged uniformly.

Therefore, the user should pump both sides of the button part around the discharging hole; in other words, the user should use both hands, which causes great inconvenience to the user.

On the other hand, the existing cosmetics container as the above has a structure wherein an air movement hole which forms at the bottom of the container in order for the piston to rise is exposed externally, so that it has disadvantage that dirt can is likely not only to get into through the air movement hole but also to debase the appearance of the container body.

In addition, the existing cosmetics container with a vacuum pump as the above comprises the container body and the support body to be combined only with the screw combination, so that the user can arbitrarily disassemble the screw combinations and separate the support body from the container body.

In case the user separates the support body from the container body, however, spoilage of the contents happens. Here have been cases wherein the user, bending the rules, uses up most of the contents and then intentionally separates the support body from the container body, and furthermore, after spoiling contents or putting foreign substance into the container body, demands exchanging the products; as a result, it is possible for sellers to have financial loss.

DETAILED DISCLOSURE

Technical Problem

This present invention has been made to solve the above-mentioned problems. The object of the present invention thereof is to provide a container with a vacuum pump for creamy-type cosmetics wherein a discharging hole of the button part is positioned to be biased, and a pressure display part is formed in the upper middle portion of the button part in order to pressurize the button part; thus a user can accurately ascertain the pressure portion of the button part, and thereby the contents can be uniformly discharged by simply pumping with one hand without causing the button part to be inclined.

Furthermore, the object of the present invention is to provide a container with a vacuum pump for creamy-type cosmetics wherein an air inflow hole is formed on the top end of the outer container and is made not to be exposed to the exterior by the support body, so that it does not only keep the container appearance but prevent foreign substances from coming into the container through the air inflow hole.

Moreover, the object of the present invention is to provide a container with a vacuum pump for creamy-type cosmetics wherein, in case a user forcefully tries to separate the support body from the outer container by reversely rotating the support body through the protrusion of the outer container and the support body, it makes the protrusion on the support body break down and thus make it possible to check the separation of the support body by examining the condition of the protrusion, which will then discourage the user's vicious behavior.

Method to Solve the Problems

To solve the above-mentioned problems, the present invention, a container provided with a vacuum pump for creamy-type cosmetics, comprises an outer container; a inner container which is combined into the inside of the said outer container, holds contents, and rises/descends according to the use of contents; a support body which is encirclingly combined into the top of the said outer container and supports a pumping member; a pumping member which is combined into the support body and discharges contents by pumping movement; a button part which is located on the upper part of the said pumping member, pressurizes the pumping member, on the middle forms a pressure display part on which a user's finger is to be secured, and a discharging hole is formed concavely downwards on the biased place from the pressure display part; and a contents movement pipe whose one end is formed on the upper part while the other end is formed on the lower part, thus moving the contents that flow through the said pumping member to the contents discharging hole.

In addition, the present invention has a feature in that a number of engaging protrusions, one side of which has a gentle slope while the other side has a vertical surface, are formed along the outer circumference, separated with constant distance on the upper part of the said outer container.

Furthermore, the present invention has a feature in that rotation protrusions and rotation grooves, which are engaged with the said engaging protrusions, are formed alternately along the inner circumference of the said support body.

Furthermore, the present invention has a feature in that the said rotation protrusions are formed corresponding with the said engaging protrusions, so that the rotation protrusions can go over the slopes of the engaging protrusions when turning the support body to the closing direction, but some of the rotation protrusions will be destroyed by the vertical surface of the said engaging protrusions when turning the support body to the opening direction.

Furthermore, the present invention has a feature in that more than one air movement hole, formed cut-open in order for air to flow into the inside of the outer container, are installed on the upper end of the outer container.

In addition, the present invention has a feature in that the said contents movement part comprises a combining pipe which is engaged into the upper part of the said pumping member, and a communicating part which forms a passage for contents which flow in through the said combining pipe, protruded upwards and combined with the said button part, and communicates with the said contents part.

Effects of Invention

As stated above, the present invention has advantages in that a discharging hole of the button part is positioned to be biased, and a pressure display part pressurizing the button part is formed in the upper middle portion of the button part; thus the user can accurately ascertain the pressure portion of the button part, and thereby the contents can be uniformly discharged by simply pumping with one hand without causing the button part to be inclined.

In addition, the present invention has advantages in that an air inflow hole is formed on the top end of the outer container and is made not to be exposed to the exterior by the support body; as a result, it not only keep the container appearance undamaged but prevent foreign substances from coming into the container through the air inflow hole.

In addition, the present invention has advantages in that, in case a user forcefully tries to separate the support body from the outer container by reverse rotation of the support body through the protrusion of the outer container and the support body, it makes the protrusion on the support body break down and thus make it possible to check the separation of the support body by examining the condition of the protrusions, which thereby discourages the user's vicious behavior.

BRIEF DESCRIPTIONS OF DRAWINGS

BEST MODES FOR CARRYING OUT THE INVENTION

In the followings, in reference with drawings, the present invention is described in detail. The same reference numbers shown in each drawing refer to the same elements.

Figure 1:
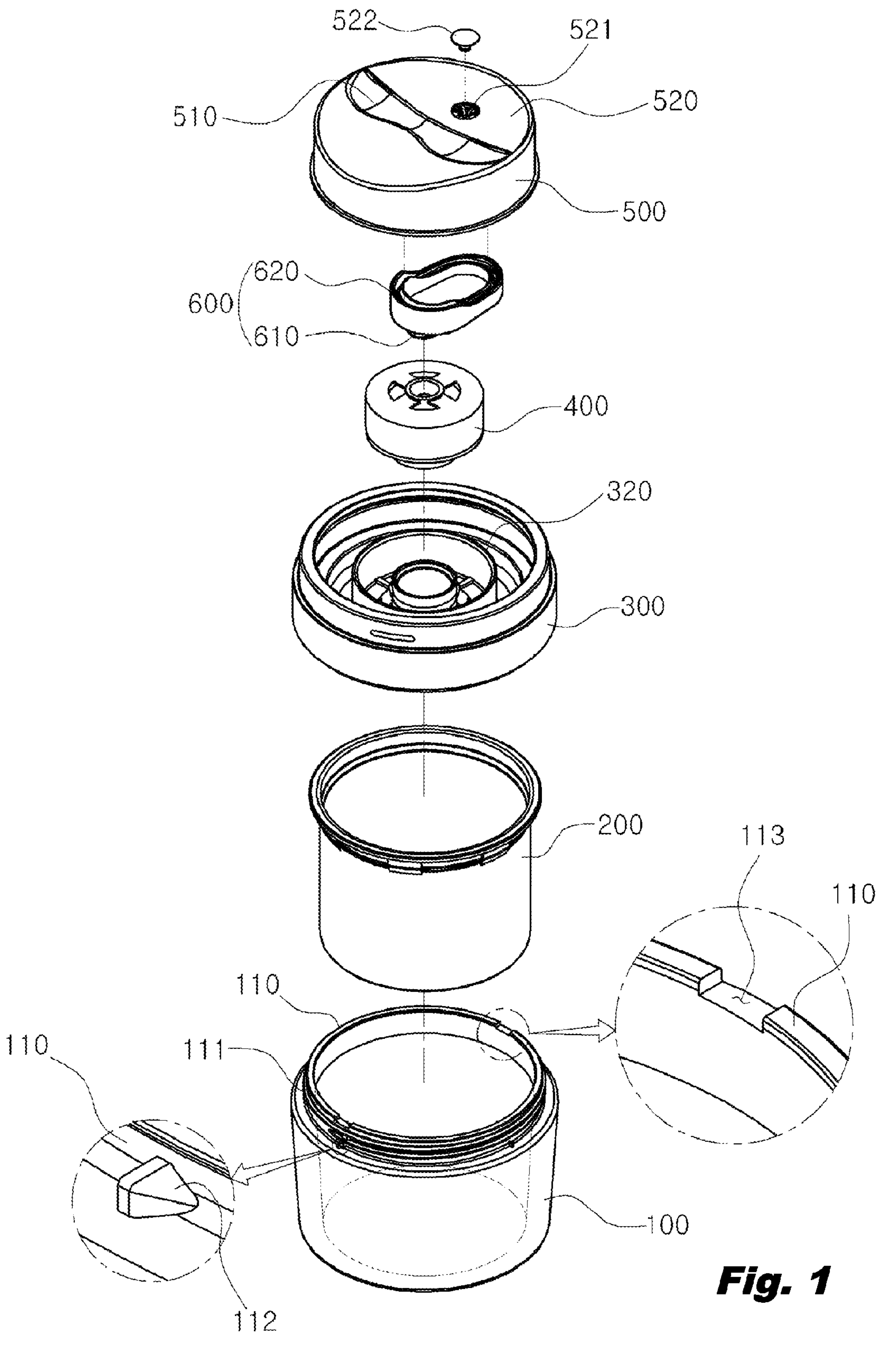
FIG. 1 is a disassembled perspective view illustrating a container provided with a vacuum pump for creamy-type cosmetics according to a preferred embodiment of the present invention.
Figure 2:
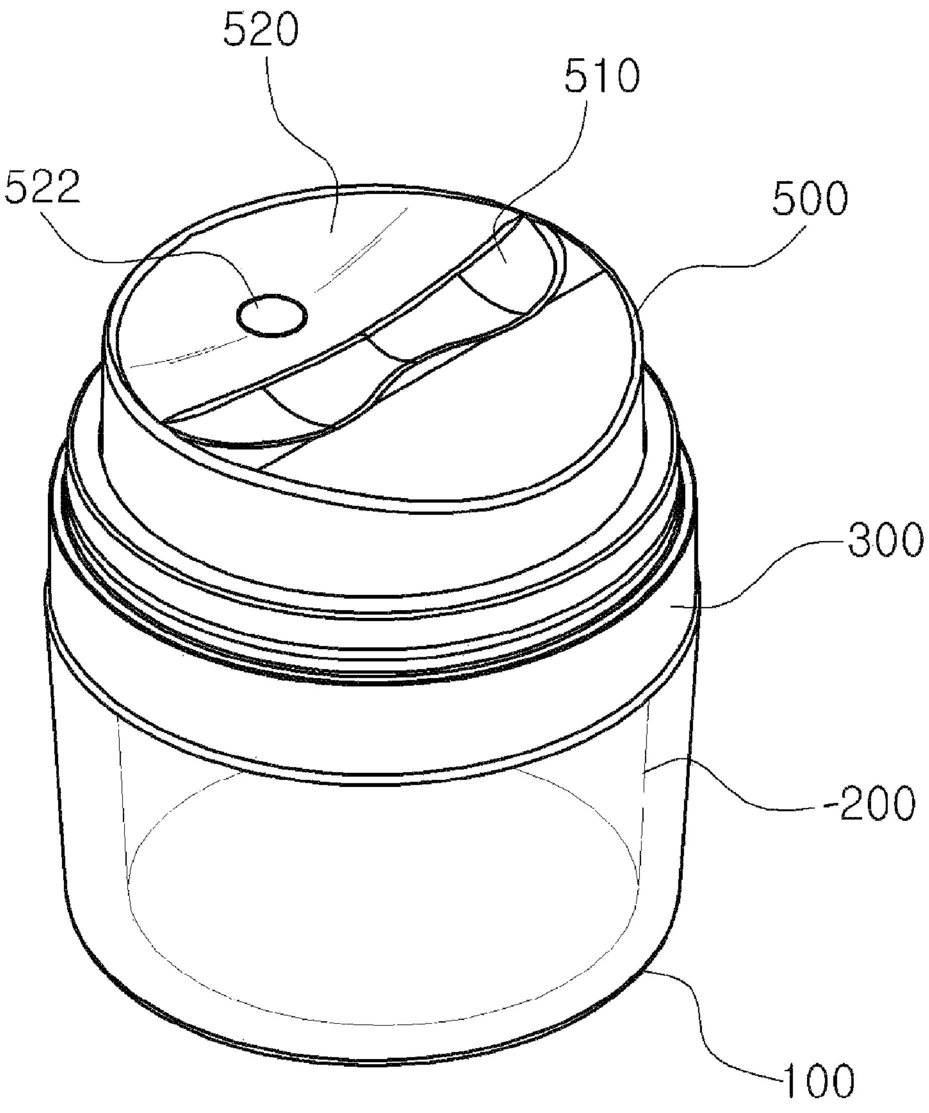
FIG. 2 is an assembled perspective view illustrating a container provided with a vacuum pump for creamy-type cosmetics according to a preferred embodiment of the present invention.
Figure 3:
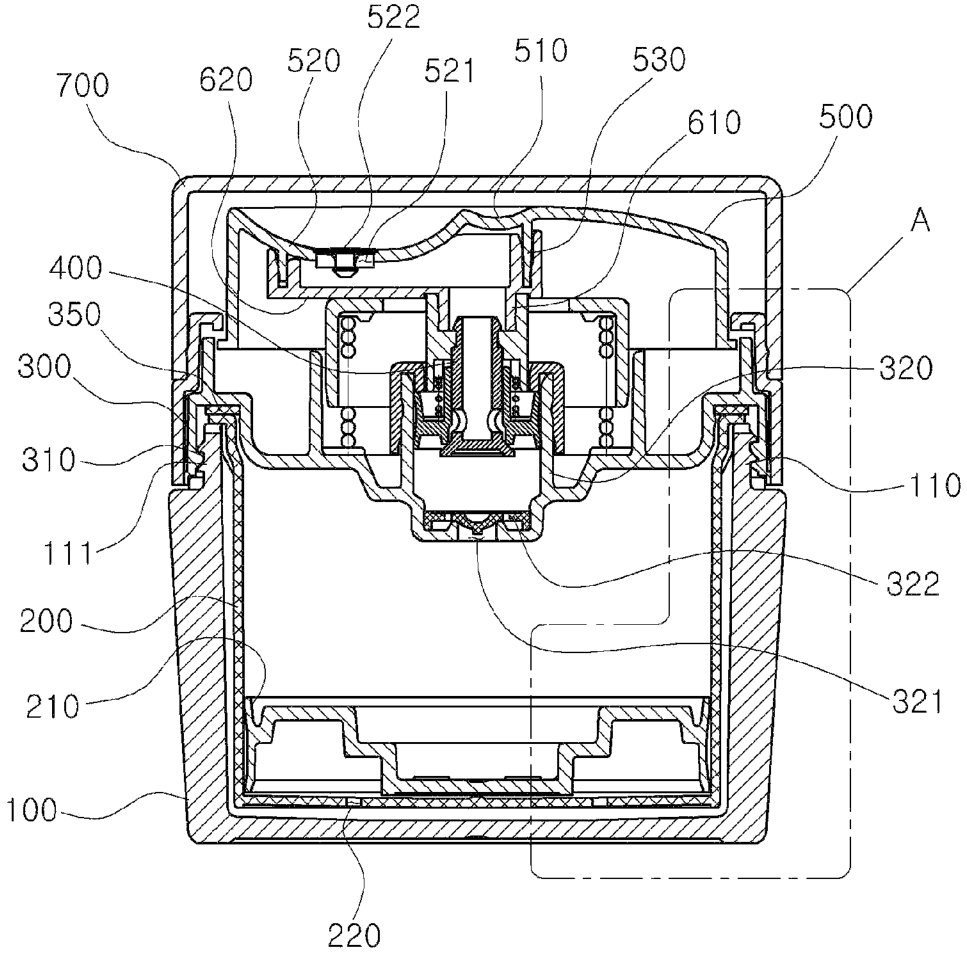
FIG. 3 is a cross-sectional view illustrating a container provided with a vacuum pump for creamy-type cosmetics according to another embodiment of the present invention.
Figure 4:
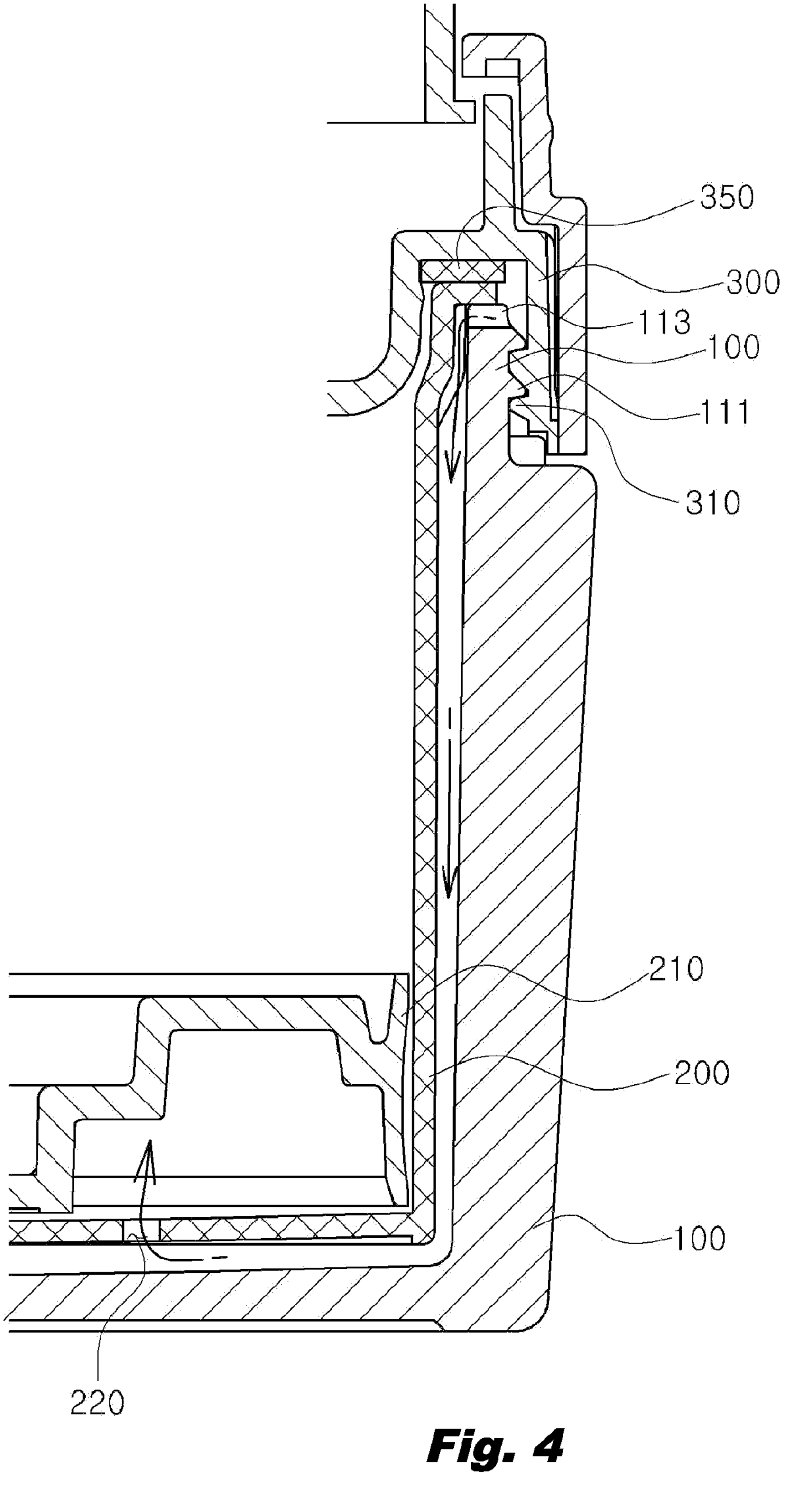
FIG. 4 is an enlarged drawing of "A" part of FIG. 3 illustrating the movement of air for the rise of piston.
Figure 5:
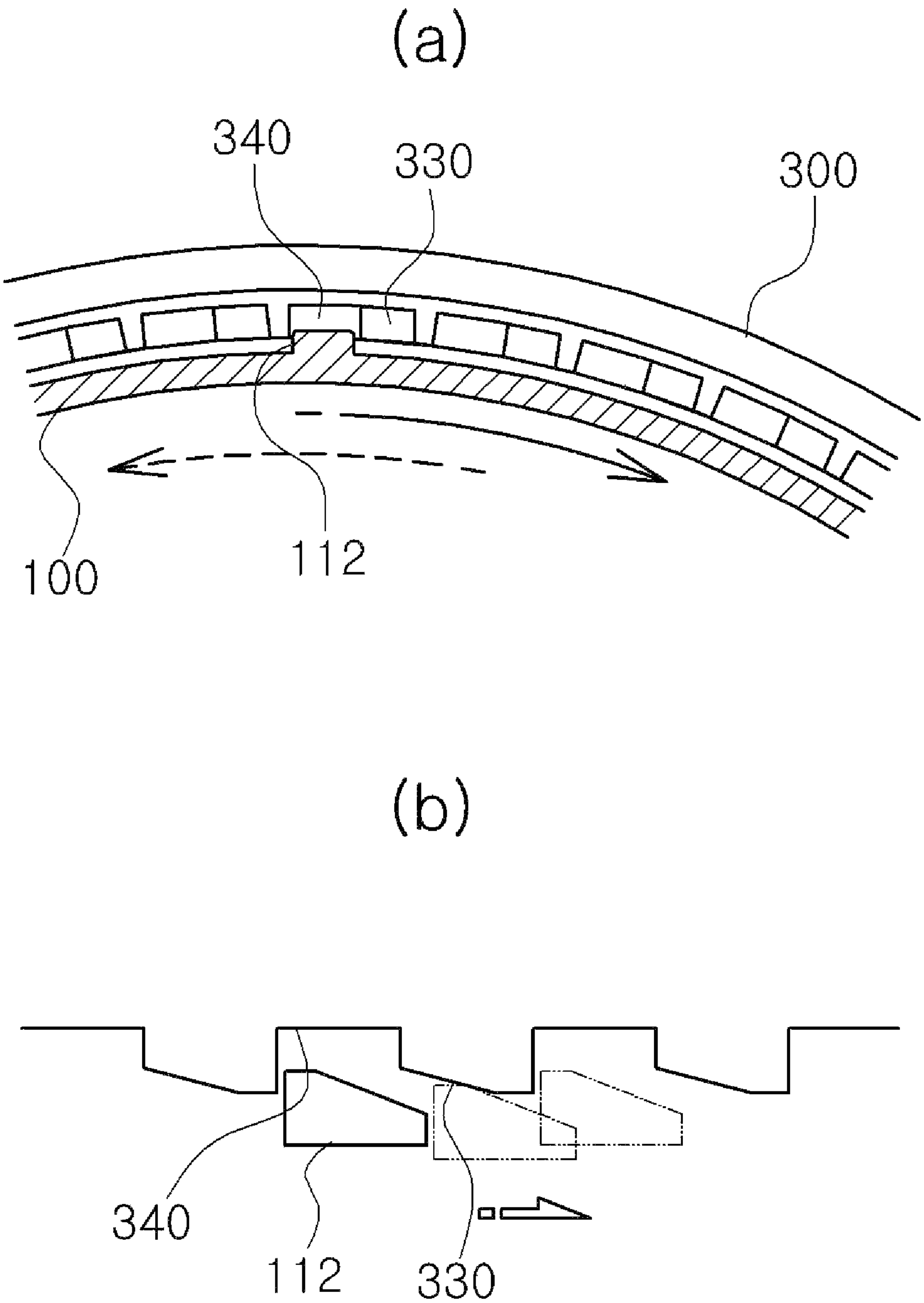
FIG. 5 is a use state drawing of the movement of a rotation protrusion when a support body rotates, illustrating a container provided with a vacuum pump for creamy-type cosmetics according to preferred embodiment of the present invention.
Figure 6:
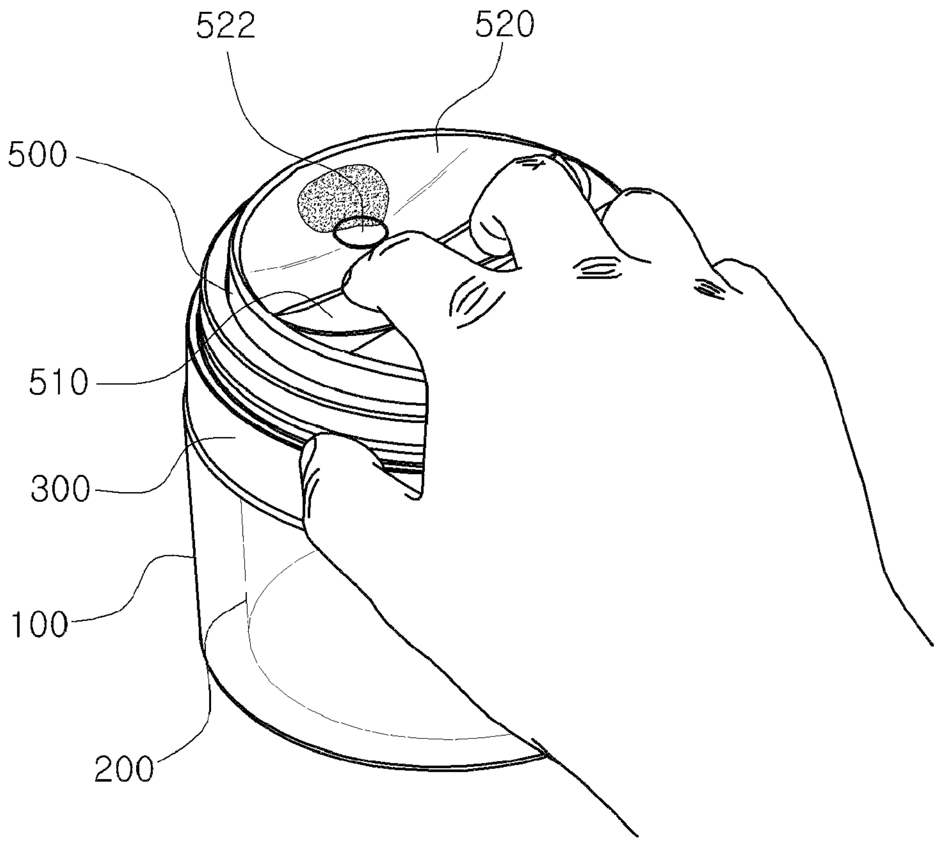
FIGS. 6 and 7 are explanation drawings illustrating a container provided with a vacuum pump for creamy-type cosmetics according to preferred embodiment of the present invention.
Figure 7:
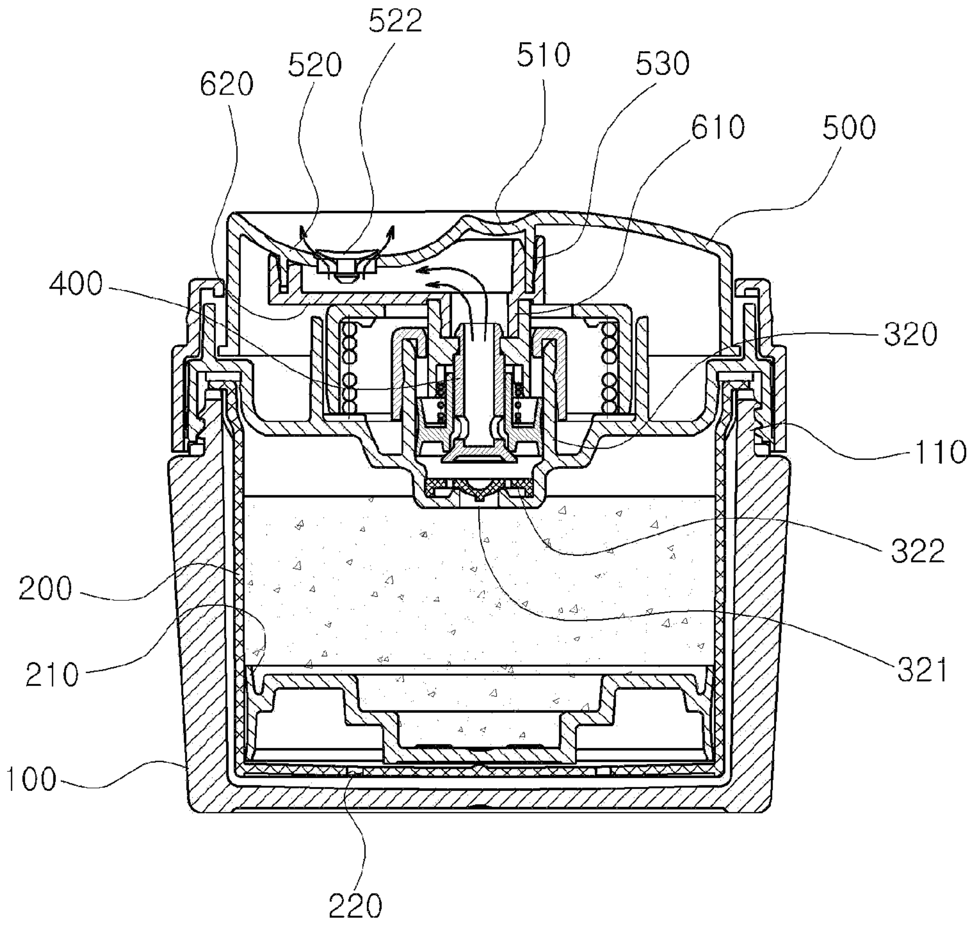

FIG. 1 is a disassembled perspective view illustrating a container provided with a vacuum pump for creamy-type cosmetics according to a preferred embodiment of the present invention, FIG. 2 is an assembled perspective view illustrating a container provided with a vacuum pump for creamy-type cosmetics according to a preferred embodiment of the present invention, and FIG. 3 is a cross-sectional view illustrating a container provided with a vacuum pump for creamy-type cosmetics according to a preferred embodiment of the present invention FIG. 4 is an enlarged drawing of "A" part of FIG. 3 illustrating the movement of air according to the rise of piston; FIG. 5 is a use state drawing of the movement of a rotation protrusion, depending on rotation of a support body, illustrating a container provided with a vacuum pump for creamy-type cosmetics according to preferred embodiment of the present invention; FIGS. 6 and 7 are explanation drawings illustrating a container provided with a vacuum pump for creamy-type cosmetics according to preferred embodiment of the present invention.

On reference to from FIG. 1 through 7, a container provided with a vacuum pump for creamy-type cosmetics according to preferred embodiment of the present invention comprises an outer container 100, an inner container 200, a support body 300, a pumping member 400, a button part 500, and a contents movement part 600.

The said outer container 100, comprises an inner container 200, which is made of transparent material so that the inner container 200 can be seen through from the outside, and a combination part 110, where a 1st screw thread 111 is installed on the upper part to be able to have a screw joint with a support body 300 that will be described later.

This present invention is featured in that a number of engaging protrusions 112, one side of which has a gentle slope while the other side has a vertical surface, are formed along the outer circumference of the combination part 110, separated with constant distance on the upper part of the said outer container 100, where the 1$^{st}$ screw thread 111 ends; thus, the said engaging protrusions 112 are formed to be able to correspond with the rotation protrusions 330 when the support body 300 turns, so that the rotation protrusions 330 can go over one side of the slopes of the engaging protrusions 112 when turning the support body 300 to the closing direction, but the rotation protrusions 330 will be interfered by the other side of the vertical surfaces of the said engaging protrusions 112 when turning the support body 300 to the opening direction.

As a result, in case a user forcefully tries to turn the support body 300 to the opening direction, it makes some of the rotation protrusions 330 break down by the engaging protrusions 112, and thus makes it possible to check if the user caused the separation of the support body 300 from the outer container 100.

Furthermore, the present invention is featured in that more than one air movement holes 113 are formed, cut-open, on the top of the combination part 110 of the said outer container 100 in order for air to flow in and out, so that, with the air movement hole 113 installed on the upper end of the combination part 110, the said air movement hole 113 covered with the support body 300 is not exposed to the outside; as a result, it not only causes the appearance undamaged but also prevents foreign substances from flowing in from the outside through the air movement hole 113.

The said inner container 200 containing cosmetics contents comprises a piston 210, which is combined into the inside of the outer container 100, and rises as the contents are being used.

In the lower part of the inner container 200, an air inflow hole 220 is installed so that the air, which flows in through the air movement hole 113, can move inside the inner container 200 and lifts the piston 210.

The said support body 300, which are combined encirclingly with the upper part of the outer container 100 and supports a pumping member 400, comprises $2^{nd}$ screw threads 310, which combines with $1^{st}$ screw threads, in order for the outer container 100 to be engaged in a screw joint.

In the middle of the said support body 300 is installed a cylinder 320, which supports the pumping member 400 and wherein a piston of the pumping member 400 rises/descends; on the lower end of the said cylinder 320 is installed a contents movement hole 321, wherein the contents in the inner container 200 flow in when the pumping member 400 moves; On the upper end of the said contents inflow hole 321 is installed a check valve 322, which opens/closes according to the movement of the pumping member 400.

The present invention is featured in that rotation protrusions 330 and rotation grooves 340, which correspond with the said engaging protrusions 112 upon the rotation of the support body 300, are installed alternately along the inner circumference on the inner surface of the said support body 300; thus, the said rotation protrusions 330, as shown in FIG. 5, are formed corresponding with the said engaging protrusions 112, so that the rotation protrusions 330 can go over the slopes of the engaging protrusions 112 when the support body 300 is turned to the closing direction, but the rotation protrusions 330 will be interfered by the vertical surfaces of the said engaging protrusions 112 when the support body 300 is turned to the opening direction.

Since the said rotation protrusions 330 are made of softer material than the engaging protrusions 112, if a user opens the support body 300, some of the rotation protrusions 330 will be destroyed by the friction with engaging protrusions 112; thus, it is possible to easily check whether the support body 300 was opened or not by the user, and to prevent users' wrongful acts, such as separation of the support body 300 and insertion of foreign substances into the inner container 200.

Meanwhile, on the said support body 300, it is recommended that a packing member 350 be installed, joining the upper end of the said inner container 200 in a screw joint with the outer container 100, thus sealing the inner container 200.

The said pumping member 400 is joined with the said support part 300 and discharges contents by pumping movement, but is considered as prior art in the field of technology where this present invention belongs; therefore, detailed explanation will be omitted.

The said button part 500 is combined with the upper part of the pumping member 400, and causes pumping movement by pressurizing the pumping member 400 according to the operation by a user. The present invention is featured in that a pressure display part 510 is formed so that a user's finger should be secured on the middle of the button part 500.

The said pressure display part 510, as shown in FIG. 6, is placed on the middle of the button part 500 and indicates the position where the finger is secured, so that the user can accurately ascertain the pressure when pressing the button part 500 for pumping action of the pumping member 400; therefore, the user can uniformly discharge the contents using just one hand with ease without tilting the button part 500.

Meanwhile, it is characterized that on the said button part 500, a discharge unit 520 comprising a discharging hole 521 is formed with downward depression, being biased from the pressure display part 510; thus, the contents moving through the discharging hole 521 are able to be discharged into the top of a dish-shaped discharge unit 520.

It is preferred that on the contents movement part 521 is installed a rubber tip 522 which blocks the contents flowing out when the user doesn't intend to, and opens up by the pressure of the contents when the contents rise up according to pumping action of the pumping member 400.

Meanwhile, on the inner surface of the said button part 500, a combining projection 530 is installed into a communicating part 620 which will be described later.

The said contents movement part 600, which is placed between the said pumping member 400 and the button part 500 and moves the contents to the discharging hole 521 through the said pumping member 400, comprises a combining pipe 610 that is engaged into the upper part of the said pumping member 400, and a communicating part 620 which forms a passage, wherein the contents moves through, and which is protruded upwards and is engaged with the combining projection 530 that is installed in the inner surface of the button part 500.

The said communicating part 620 is engaged with a combining projection 530 in a tightly fitting joint and communicates with the said discharging hole 521, leading the contents that flow in from the pumping member 400 to be discharged to the outside through the discharging hole 521.

The said over cap 700 encircles the button part 500 on the upper part of the said outer container 100 and is combined with the said support body 300 to be able to be separated, and thus prevent the button part 500 from malfunctioning.

Hereinbefore, some preferable embodiments are disclosed in the drawings and the description. Here, although specified terms are used, they are only used for describing the objective of the invention but not for limiting the definition or the scope of the invention written in the claims. Accordingly, those skilled in the art shall understand that various modifications and other equivalent examples can be implemented according to the above examples. Therefore, the technical scope, required to be protected in the invention, shall depend on the technical thoughts of claims attached.

The invention claimed is:

1. A container provided with a vacuum pump for creamy-type cosmetics, comprising:

an outer container;

an inner container which is engaged to the inside of the said outer container, comprising a piston that rises according to the usage of contents inside;

a support body which is encirclingly engaged to the outer container and supports a pumping member;

wherein the pumping member is engaged to the support body and discharges contents by a pumping movement; and a button part which is placed on an upper part of the pumping member and pressurizes the pumping member, the button part further comprising;

a pressure display part which is formed in a middle in order for a finger to be secured to press the pumping member;

a discharge unit which is formed concavely downwards, wherein a contents discharging hole is formed on the biased place from the pressure display part; and a contents movement part, whose one end is formed on the upper part while the other end is formed on a lower part, thus transferring the contents that move through the pumping member to the contents discharging hole, wherein more than one air movement holes are formed, cut-open, on the top of the outer container in order for air to flow into the inside.

2. The container provided with a vacuum pump for creamy-type cosmetics according to claim 1, wherein a number of engaging protrusions having a gentle slope on one side and a vertical surface on the other side, are formed along an outer circumference of a combination part, separated with constant distance on the upper part of the outer container.

3. The container provided with a vacuum pump for creamy-type cosmetics according to claim 2, wherein rotation protrusions and rotation grooves in contact with the engaging protrusions, are installed alternately along an inner circumference on an inner surface of the support body.

4. The container provided with a vacuum pump for creamy-type cosmetics according to claim 3, wherein the rotation protrusions are formed corresponding with the engaging protrusions, so that the rotation protrusions can go over the slopes of the engaging protrusions when the support body is turned to the closing direction, whereas some of the rotation protrusions will be destroyed by the vertical surfaces of the engaging protrusions when the support body is turned to the opening direction.

5. The container provided with a vacuum pump for creamy-type cosmetics according to claim 1, wherein the contents movement part comprises:

a combining pipe which is engaged into the upper part of the pumping member, a communicating part which forms a passage where the contents move through the combining pipe, wherein the communicating part protrudes upwards and engages the button part while communicating with the contents movement hole.

6. The container provided with a vacuum pump for creamy-type cosmetics according to claim 1, wherein a rubber tip which is opened by the pressure of the contents is attached to the discharging hole.

7. A container provided with a vacuum pump for creamy-type cosmetics, comprising:

an outer container;

an inner container which is engaged to the inside of the said outer container, comprising a piston that rises according to the usage of contents inside;

a support body which is encirclingly engaged to the outer container and supports a pumping member;

wherein the pumping member is engaged to the support body and discharges contents by a pumping movement; and a button part which is placed on an upper part of the pumping member and pressurizes the pumping member, the button part further comprising;

a pressure display part which is formed in a middle in order for a finger to be secured to press the pumping member;

a discharge unit which is formed concavely downwards, wherein a contents discharging hole is formed on the biased place from the pressure display part; and a contents movement part, whose one end is formed on the upper part while the other end is formed on a lower part, thus transferring the contents that move through the pumping member to the contents discharging hole, wherein a number of engaging protrusions having a gentle slope on one side and a vertical surface on the other side, are formed along an outer circumference of a combination part, separated with constant distance on the upper part of the outer container, wherein rotation protrusions and rotation grooves in contact with the engaging protrusions, are installed alternately along an inner circumference on an inner surface of the support body, and wherein the rotation protrusions are formed corresponding with the engaging protrusions, so that the rotation protrusions can go over the slopes of the engaging protrusions when the support body is turned to the closing direction, whereas some of the rotation protrusions will be destroyed by the vertical surfaces of the engaging protrusions when the support body is turned to the opening direction.

* * * * *